United States Patent

[11] 3,594,591

[72] Inventor Robert R. Laupman
Wijchen, Netherlands
[21] Appl. No. 791,262
[22] Filed Jan. 15, 1969
[45] Patented July 20, 1971
[73] Assignee N. V. Auco
Wijchen, Netherlands
[32] Priority Jan. 15, 1968
[33] Netherlands
[31] 6800603

[54] ALTERNATING CURRENT CONTROL DEVICE
11 Claims, 9 Drawing Figs.

[52] U.S. Cl. .......... 307/252 B, 307/252 N, 307/305
[51] Int. Cl. .......... H03k 17/00
[50] Field of Search .......... 307/252, 305

[56] References Cited
UNITED STATES PATENTS
3,443,188 5/1969 Mortimer .......... 307/305 X

*Primary Examiner*—Donald D. Forrer
*Assistant Examiner*—John Zazworsky
*Attorney*—Mason, Porter, Diller and Brown, Diller, Brown, Ramik and Holt

ABSTRACT: A device for controlling AC flowing through a load by means of an AC thyristor which is triggered through a trigger control network arrangement comprising an AC diode and a network arrangement known per se which functions as a bilateral transistor. In order to obtain an automatic compensation for inequalities of the transistors used in the aforesaid network arrangement, and also in order to extend the range over which the AC current value can be controlled, a capacitor is included between said AC diode and said network arrangement known per se.

INVENTOR.
ROBERT RONALD LAUPMAN
BY
Mason, Porter, Diller & Brown
ATTORNEYS

INVENTOR.
ROBERT RONALD LAUPMAN
BY
Mason, Porter, Diller & Brown
ATTORNEYS

INVENTOR.
ROBERT RONALD LAUPMAN
BY
Mason, Porter, Diller & Brown
ATTORNEYS

PATENTED JUL 20 1971

3,594,591

INVENTOR.
ROBERT RONALD LAUPMAN
BY
Mason, Porter, Diller & Brown
ATTORNEYS

INVENTOR.
ROBERT RONALD LAUPMAN
BY Mason Porter Diller & Brown
ATTORNEYS

ALTERNATING CURRENT CONTROL DEVICE

The invention relates to an alternating current control device having one or more inputs for manual and/or automatic control of the r.m.s. value of the current.

It is known to control the r.m.s. value of alternating current flowing through a given load by means of a triode AC semiconductor switching element (AC thyristor, Triac), which is series connected with said load and connected to the AC main supply. As a rule the ignition of the Triac is effectuated by means of a diode AC semiconductor switching element (diac), which is connected to the gate of the triac and which is fed from an RC network which is connected across the triac.

Figure 1:
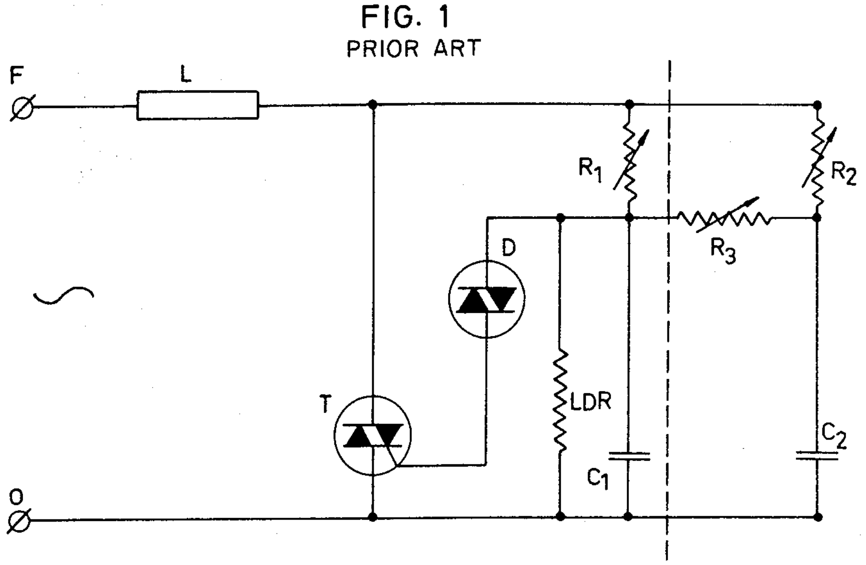
FIG. 1 PRIOR ART

FIG. 1 shows the most simple embodiment of such known circuit arrangement. The triac T is series connected with the load L across the AC supply. The diac D is fed from the capacitor $C_1$ which is charged through the resistor $R_1$. These last mentioned components are series connected to each other and are connected across the triac. According to the prior art a second RC combination $R_2C_2$ can be added, which combination is coupled to the junction of the first RC combination $R_1C_1$ via the resistor $R_3$, in order to improve the stability during the start of this ignition device and in order to prevent a hysteresis effect during said start. Reference is made to a transitron publication about triacs (see General Electric SCR Manual, 4th edition). The ignition can be controlled by adjusting the resistors $R_1$, $R_2$ and/or $R_3$. It is also possible to shunt one of the capacitors $C_1$ or $C_2$ with a control resistor and to delay by means thereof the charging of $C_1$ or $C_2$ and consequently to delay the ignition moment. For an automatic control a photosensitive resistor (LDR) may be used which has a very high dark resistance and very low light resistance.

If control elements are used which produce a lower variation in resistance than an LDR, this known circuit arrangement is not sensitive enough to effect an automatic control over the full sine wave. For instance a temperature dependent NTC or PTC resistor merely gives a variation of the resistance of 1:2 when temperature varies over a very large range. Then for said circuit arrangement this is much too small a variation for effecting a complete control from zero to full current.

The invention provides a circuit arrangement which provides an extremely sensitive input for said control device and wherein with a NTC resistor across said input a temperature sensitivity with an accuracy of 1° C. is produced. Said circuit arrangement does not need an adjustment because it comprises an automatic compensating control of the semiconductors used.

Figures 2A, 2B, 2C:
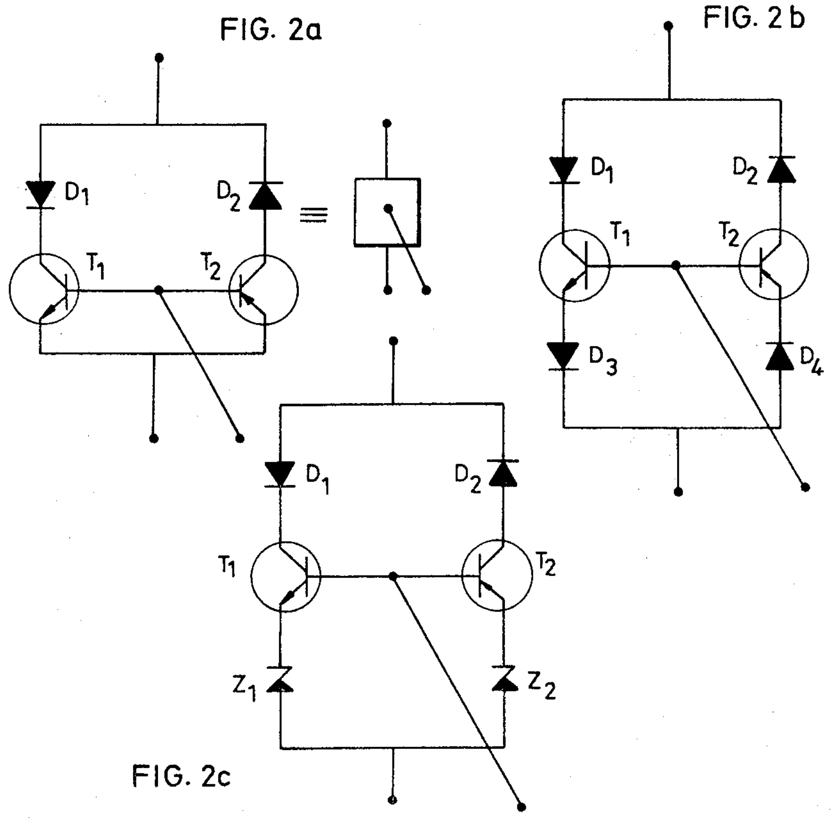

FIG. 2*a* shows an embodiment of a triode AC control device comprising two branches each composed of a transistor and a diode, these diodes being poled for conducting currents of opposite directions, and wherein the bases of the transistors are interconnected. The device functions as a bilateral transistor and is very well suitable for an integrated structure. In that latter case, however, the large chance should be taken into account that the NPN and PNP transistor will have unequal properties (gain factors and the like). According to the invention provisions should be made to this effect.

FIG. 2*b* shows an alternative of the circuit arrangement according to FIG. 2*a* to which two diodes $D_3$ and $D_4$ which provide a Zener-effect during the starting period, are added.

FIG. 2*c* shows a further alternative comprising the Zener-diodes $Z_1$ and $Z_2$ in the emitter leads in order to obtain the same effect to a higher degree. However, as a rule, this circuit arrangement is more expensive and it is still more difficult to obtain equal operation as to the left-hand branch and in the right-hand branch.

Therefore the simple embodiment of FIG. 2*a* is to be preferred.

Figure 3:
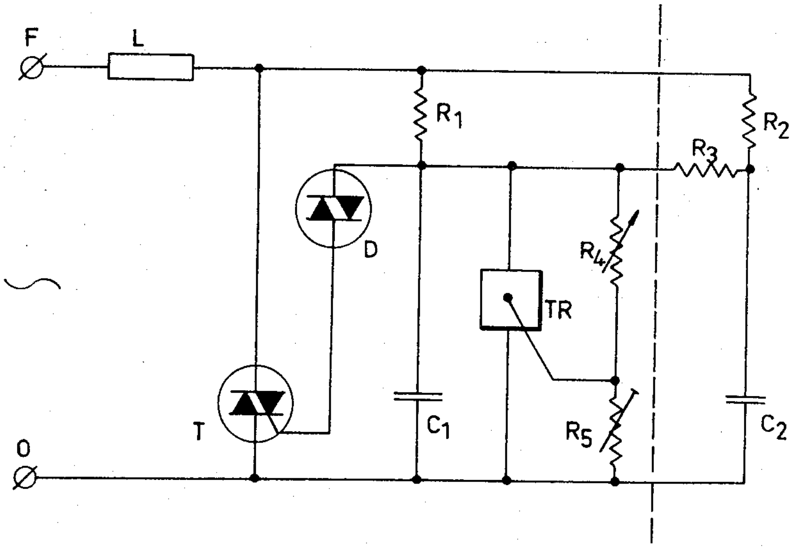

FIG. 3 shows an application of the circuit arrangement according to FIG. 1: the triode control device TR is connected across the capacitor $C_1$ and its control terminal is connected to the upper end of a voltage divider $R_4R_5$, which is also connected across the capacitor $C_1$. By varying one of the resistors $R_4$ or $R_5$, the charging rate of the capacitor $C_1$ will be changed, so that also the ignition moment is shifted. However, the sensitivity for said variation is very large, so that now one of the resistors $R_4$ or $R_5$ can be dimensioned as a NTC resistor while the other may be used for effecting as a preliminary adjustment by hand. Then the temperature sensitivity is very high and renders a temperature control within 1° C. amply possible. However, automatic control over a range extending over the full sine wave cannot be achieved with this circuit arrangement.

As already stated inequality of the transistors $T_1$ and $T_2$ in the control device TR also an inequality in the shifting of the ignition moment. This is a serious deficiency, especially when control of AC motors, more in particular AC fans having a short circuited armature, is concerned.

Figure 4:
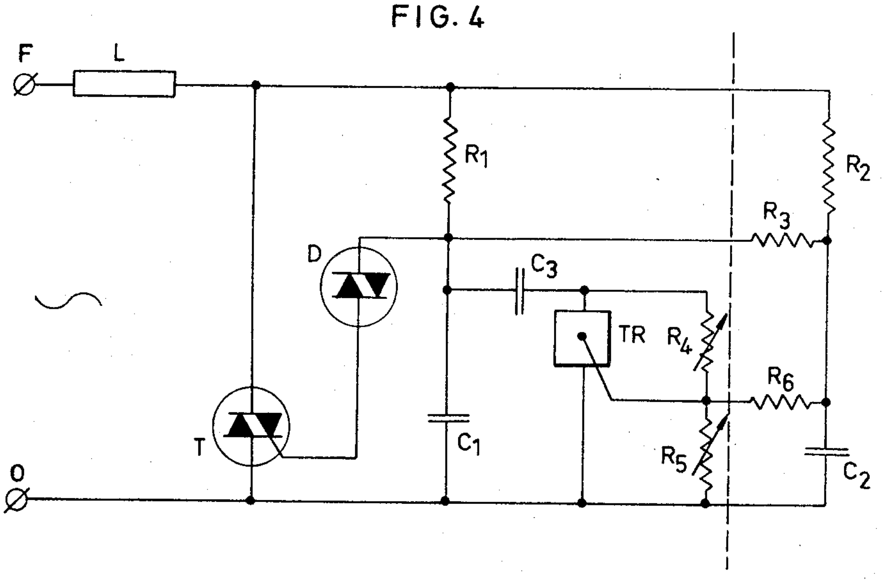

According to the invention a surprising solution to the above-mentioned problems is obtained by connecting a capacitor in series with the control device TR and the voltage divider connected in parallel thereto; thereby an automatic compensation for the above indicated inequality is achieved, while moreover the control range is caused to extend over the full sine wave. FIG. 4 shows a circuit arrangement wherein this solution is incorporated.

The capacitor $C_3$ is series connected with the control device TR and the voltage divider $R_4R_5$ connected in parallel thereto. The operation is as follows:

If at a predetermined adjustment of the voltage divider $R_4R_5$ the control device TR will become conductive during a positive voltage period, the capacitor $C_3$ is charged. The voltage produced across the capacitor $C_3$ each time that capacitor is charged during a half cycle, is maintained during the following half cycle until the control device becomes conductive again. The voltage thus maintained, by its value is representative of the point of time at which the triac T was triggered into conduction during the previous half cycle. This voltage across capacitor $C_3$ has the effect of compensating inequalities in the two branches included in the control device TR, in the sense that the voltage maintained across $C_3$ in combination with the voltage developed across capacitor $C_1$ is effective to rigger the triac T into conduction at the same point of time relative to the beginning of the half cycles. This circuit arrangement according to the invention produces a surprising compensation with regard to unequal semiconductors in the control device TR. This is of considerable importance in case TR is an integrated structure, which is extremely difficult to dimension with equal branches, particularly in regard to the transistors and such can only be obtained by selection. Owing to this the cost price is substantially increased.

The use of the resistor $R_6$ between the voltage divider $R_4R_5$ and the RC member $R_2C_2$, advances the operation of the control device TR and makes the circuit arrangement still more sensitive.

Figure 5:
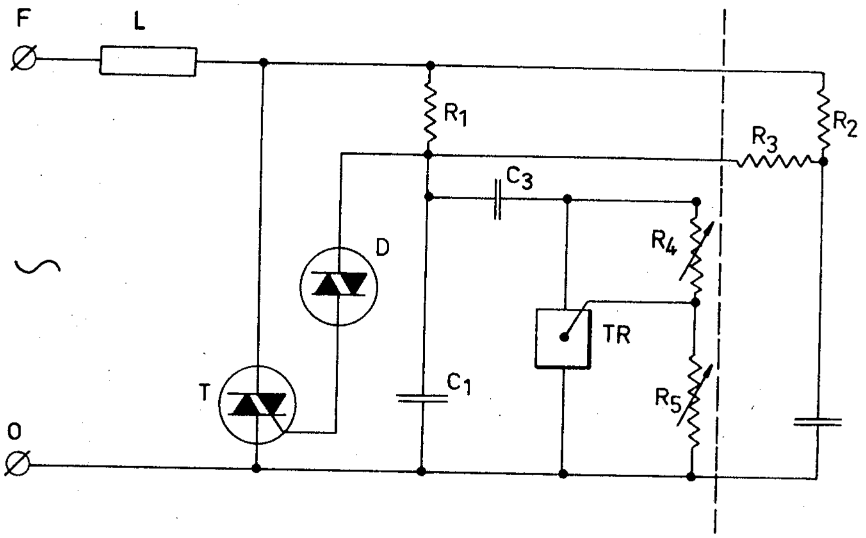

FIG. 5 shows the same circuit arrangement wherein the control device TR is reversed. In that case variation of the resistors $R_4$ and $R_5$ produces a shift of the ignition moment which is opposite relative to that of the arrangement according to FIG. 4.

Figure 6:
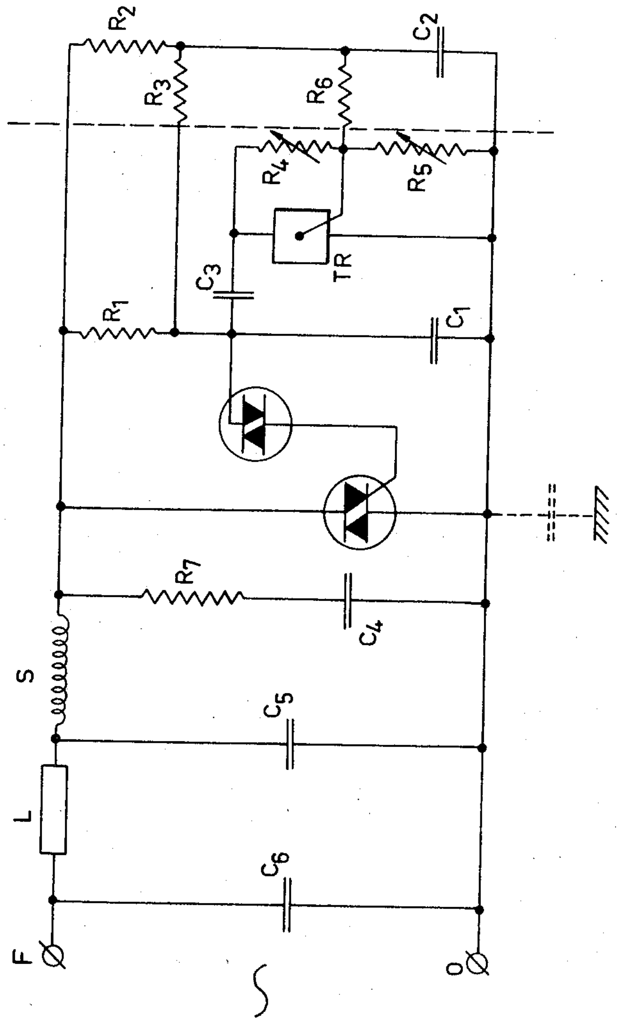

FIG. 6 shows how the embodiment of FIG. 4 can be arranged for an inductive load L; following parts are added: the well-known RC combination $R_7C_4$ serving to prevent oscillations of the triac T, the filter comprising the choke coil S and the capacitor $C_5$ and if desired the capacitor $C_6$ effective to eliminate undesired interfering pulses occurring on the main voltage supply and in order to improve the load impedance presented to the main voltage supply.

If the resistor $R_5$ is dimensioned as a remote control element it is desireable according to the invention to directly connect the O-conductor with the resistor $R_5$ and consequently not to include a choke coil in said conductor. When using longer conductors at $R_5$, they will consequently not radiate. When using a long O-conductor, the O-connection of the circuit arrangement may be earthed through a capacitor, if desired.

A same arrangement of FIG. 5 then results in corresponding possibilities, wherein the control of $R_5$ produces a reversed effect. This is important for an automatic temperature control with heating elements. Although in the case of heating elements an equal ignition in − and + direction is less essential, also here the capacitor $C_3$ is important for obtaining a balanced load of the AC main supply, for which feature the administrations of power plans show an increasing interest now that thyristors and triacs are used more and more.

When using the circuit arrangement shown in FIG. 6 for the automatic control of AC fans, it may be desireable to have a minimum control and in some cases also a maximum control at one's disposal. Such control operations can be obtained in a well-known manner by providing a second diac ignition network, wherein the diac discharges itself on the same triac.

Figure 7:
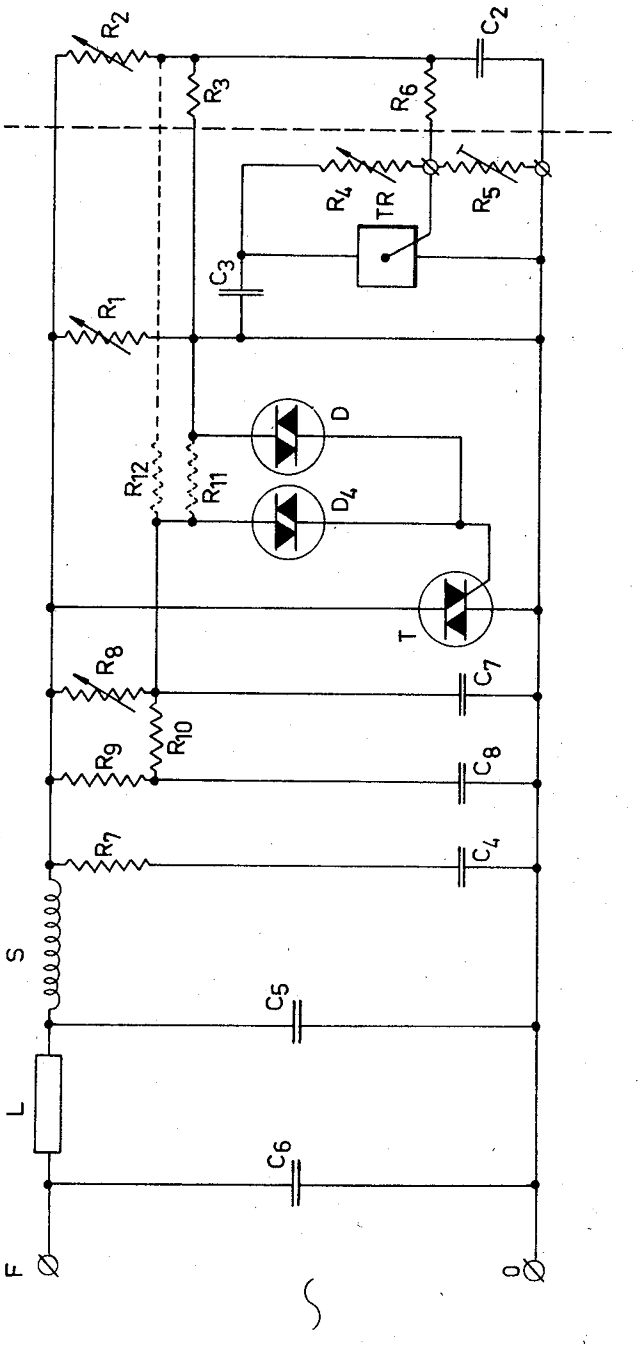

The maximum control is obtained in a simple manner varying one of the resistors $R_1$, $R_2$ or $R_3$. Such an embodiment is shown in FIG. 7. A second ignition diac $D_4$ is fed from the RC-member $R_8C_7$ and if desired stabilized by the RC-member $R_9C_8$, which is coupled thereto through the resistor $R_{10}$. According to the invention the taking over of the ignition by the second diac is substantially improved by means of the coupling resistors $R_{11}$ and $R_{12}$ which strongly suppress the hysteresis effect occurring during said taking over.

Instead of the control resistors other control elements may also be used, provided the resistance thereof will vary sufficiently in order to fully excitate the control device.

The portion at the right-hand side of the broken line drawn in the figures is in particular effective to improve the start of the control process; however, this part is not essential for the further control range. The resistor $R_6$ provides an improvement of the input sensitivity.

The operative voltage of the resistor $R_5$ is very low and has as its maximum value the emitter-base voltage surge of the silicon transistors which are preferably used. Consequently there is practically no loss of energy in this control resistor, this contrary to other circuit arrangements in this field. This is important when using very small control resistors having a slight heat capacity, which here are substantially not heated.

Although the reliability in operation thereof is not yet entirely understood in the meantime high voltage diode AC semiconductor switching elements have been put on the market which can be ignited by means of igniting coils, wherein the ignition device up to the ignition coil may be arranged in analogy to a triac-ignition device.

Obviously when triacs are mentioned above they may be replaced by the above mentioned combination of diode switching elements comprising an ignition coil (See Electronics World, May 1965, page 42, FIG. 1/I).

I claim:

1. An alternating current control device comprising a triode AC semiconductor switching element (triac T), having a gate, series connected to a load, an ignition device having a resistor-capacitor circuit $R_1C_1$ which is connected in parallel to said triode AC semiconductor switching element T and includes a first resistor $R_1$ and a first capacitor $C_1$, a junction between said first resistor $R_1$ and said first capacitor $C_1$ being connected to the gate of the said triode AC semiconductor switching element T via a diode AC semiconductor switching element (diac D) characterized in that a second capacitor $C_3$ is included between said junction of said first resistor $R_1$ and said first capacitor $C_1$ and a control circuit arrangement TR, the control input terminal of which is connected to a tapping of a voltage divider $R_4R_5$ which is connected in parallel to said control circuit arrangement TR.

2. An alternating current control device according to claim 1, wherein a second RC circuit $R_2$,$C_2$ including a second resistor $R_2$ and a third capacitor $C_2$ is connected in parallel to said triode AC semiconductor switching element T and said junction between said first resistor $R_1$ and said second capacitor $C_1$ is connected to a junction of said second resistor $R_2$ and said third capacitor $C_2$, via a third resistor $R_3$, said tapping of the said voltage divider $R_4$,$R_5$ being connected to said junction between said second resistor $R_2$ and said third capacitor $C_2$, via a fourth resistor $R_6$.

3. An alternating current control device according to claim 2, wherein said fourth resistor is variable.

4. An alternating current control device according to claim 2, wherein said voltage divider $R_4$,$R_5$ is adjustable.

5. An alternating current control device according to claim 3, wherein said voltage divider $R_4$,$R_5$ is adjustable.

6. An alternating current control device according to claim 1, wherein said voltage divider $R_4$,$R_5$ includes a plurality of resistors, at least one of which is adjustable.

7. An alternating current control device according to claim 2, wherein said voltage divider $R_4$,$R_5$ includes a plurality of resistors, at least one of which is adjustable.

8. An alternating current control device according to claim 3, wherein said voltage divider $R_4$,$R_5$ includes a plurality of resistors, at least one of which is adjustable.

9. An alternating current control device according to claim 4, wherein said voltage divider $R_4$,$R_5$ includes a plurality of resistors, at least one of which is adjustable.

10. An alternating current control device according to claim 1, wherein said voltage divider $R_4$,$R_5$ includes a plurality of resistors, at least one of which is a temperature sensitive resistor.

11. An alternating current control device according to claim 2, wherein said voltage divider $R_4$,$R_5$ includes a plurality of resistors, at least one of which is a temperature sensitive resistor.